(12) United States Patent
Birtcher et al.

(10) Patent No.: US 10,809,115 B2
(45) Date of Patent: Oct. 20, 2020

(54) ULTRASONIC LIQUID LEVEL SENSING SYSTEM

(71) Applicant: Versum Materials US, LLC, Tempe, AZ (US)

(72) Inventors: Charles Michael Birtcher, Valley Center, CA (US); Thomas Andrew Steidl, Escondido, CA (US)

(73) Assignee: Versum Materials US, LLC, Tempe, AZ (US)

(*) Notice: Subject to any disclaimer, the term of this patent is extended or adjusted under 35 U.S.C. 154(b) by 283 days.

(21) Appl. No.: 15/527,628

(22) PCT Filed: Nov. 18, 2015

(86) PCT No.: PCT/US2015/061307
§ 371 (c)(1),
(2) Date: May 18, 2017

(87) PCT Pub. No.: WO2016/081581
PCT Pub. Date: May 26, 2016

(65) Prior Publication Data
US 2018/0023994 A1     Jan. 25, 2018

Related U.S. Application Data

(60) Provisional application No. 62/081,266, filed on Nov. 18, 2014.

(51) Int. Cl.
*G01F 23/296*     (2006.01)

(52) U.S. Cl.
CPC ................ *G01F 23/2961* (2013.01)

(58) Field of Classification Search
CPC ...... G01F 23/00; G01F 23/0007; G01F 23/28; G01F 23/296; G01F 23/2961
(Continued)

(56) References Cited

U.S. PATENT DOCUMENTS

| 4,063,457 A | 12/1977 | Zekulin et al. |
| 4,077,022 A | 2/1978 | Pitts |

(Continued)

FOREIGN PATENT DOCUMENTS

| CN | 2384205 Y | 6/2000 |
| CN | 102841389 A | 12/2012 |

(Continued)

OTHER PUBLICATIONS

Korean International Search Report and Written Opinion of the International Searching Authority, dated Feb. 16, 2016, for PCT/US15/61307.

*Primary Examiner* — Benjamin R Schmitt
(74) *Attorney, Agent, or Firm* — Lina Yang (57) ABSTRACT

An ultrasonic sensor probe (100) and controller (109). The controller (109) is operationally configured to determine and display wet and dry status of each of a plurality of ultrasonic sensors (156) positioned in the barrel (123) of the probe (100). The controller (109) may change the status of a sensor (156) from wet to dry or dry to wet if certain conditions are met, such as the sensor (156) consistently indicates the new status over multiple readings or over a predetermined period of time. The controller (109) preferably includes a two-wire output capable of producing a stepped analog or digital signal that indicates the fluid level in a container in which the probe (100) is positioned.

12 Claims, 5 Drawing Sheets

(58) Field of Classification Search
USPC .......................................... 73/290 R, 290 V
See application file for complete search history.

(56) References Cited

U.S. PATENT DOCUMENTS

| | | | |
|---|---|---|---|
| 4,523,472 A | | 6/1985 | Blades |
| 5,437,178 A | | 8/1995 | Esin et al. |
| 5,808,200 A | * | 9/1998 | Dam .................... G01N 29/024 73/610 |
| 6,332,358 B1 | | 12/2001 | Atkinson |
| 2005/0035769 A1 | | 2/2005 | Otto et al. |
| 2007/0074571 A1 | * | 4/2007 | Haynes ............... G01F 23/2961 73/584 |
| 2010/0257931 A1 | | 10/2010 | Partington et al. |
| 2014/0338443 A1 | | 11/2014 | Birtcher et al. |

FOREIGN PATENT DOCUMENTS

| | | |
|---|---|---|
| GB | 2352523 A | 1/2001 |
| JP | 59155522 A2 | 9/1984 |
| JP | 5223619 A2 | 8/1993 |
| JP | 08122128 | 5/1996 |
| TW | 201443401 A | 11/2014 |
| WO | 9302340 | 2/1993 |
| WO | 03012379 A1 | 2/2003 |

* cited by examiner

ULTRASONIC LIQUID LEVEL SENSING SYSTEM

CROSS REFERENCE TO RELATED APPLICATIONS

U.S. patent application Ser. No. 14/163,407, filed Jan. 24, 2014 and U.S. Provisional Patent Application No. 62/043,668, filed Aug. 29, 2014 are hereby incorporated by reference as if fully set forth.

BACKGROUND OF INVENTION

Semiconductor manufacturing processes involve the use of chemical reagents that must meet strict purity requirements. These liquid chemical reagents are typically contained in sealed containers (e.g., ampoules) to protect against contamination of the chemical reagents and to prevent leakage. The chemical reagents typically require metal containers and container fittings that use metal-on-metal seals to avoid corrosion, contamination, or leakage under elevated pressures. When using a chemical reagent stored in such a container, it is often necessary to be able to determine the amount of chemical reagent left in the container without exposing the chemical reagent to the environment or exposing an operator to the chemical reagent.

Ultrasonic probes are commonly used in the semiconductor industry to measure the level of chemical reagent within a sealed container. A typical design includes multiple ultrasonic sensors positioned in a series along the length of a conduit within the probe, such as the sensors and configuration disclosed in U.S. Pat. No. 5,663,503 to Dam et al. A signal processing device (e.g., a controller, meter, personal computer, etc.) transmits electronic signals to the ultrasonic sensors, which in turn generate bursts of sound waves that pass through the conduit and echo back to the sensors. Each sensor converts the echoed waves it receives into electronic signals that are transmitted back to the signal processing device. The signal processing device then interprets the electronic signals to determine the intensity of the echoed waves as well as the time that elapsed between emission and the arrival of the echoed waves. For each sensor positioned along a particular portion of the conduit, the speed with which the ultrasonic waves travel through the conduit and the intensity of the echoed ultrasonic wave will differ depending on whether that portion of the conduit contains chemical reagent or gas or vapor (i.e., sound travels faster through a liquid medium as compared to gas or vapor). In this manner, the signal processing device can determine the level of the chemical reagent along the length of the conduit and therefore the amount of chemical reagent within the container.

Generally, a greater number of ultrasonic sensors disposed within the ultrasonic probe translates into increased accuracy in measuring chemical reagent levels. Conventional methods of making electrical connections between the sensors and a controller consume are deficient because the space required to accommodate the additional connections needed for higher numbers of sensors exceeds the size of the conduit. In addition, conventional methods of operating the sensors are deficient because they restrict options for making such electrical connections in a reliable manner (e.g., in a manner that avoids crosstalk).

Accordingly, there is a need in the art for an ultrasonic probe having improved means for making electrical connections between the sensors and the controller and an improved method of operating the sensors, thereby enabling the ultrasonic probe to reliably operate an increased number of ultrasonic sensors while using existing, standardized container fittings.

BRIEF DESCRIPTION OF THE DRAWINGS

Embodiments of the claimed invention will hereinafter be described in conjunction with the appended drawing figures wherein like numerals denote like elements.

DETAILED DESCRIPTION OF THE PREFERRED EMBODIMENTS

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

In the figures, elements that are similar to those of other embodiments of the present invention are represented by reference numerals increased by a value of 100. Such elements should be regarded as having the same function and features unless otherwise stated or depicted herein, and the discussion of such elements may therefore not be repeated for multiple embodiments.

The term "conduit," as used in the specification and claims, refers to one or more structures through which fluids can be transported between two or more components of a system. For example, conduits can include pipes, ducts, passageways, and combinations thereof that transport liquids, vapors, and/or gases.

The term "flow communication," as used in the specification and claims, refers to the nature of connectivity between two or more components that enables liquids, vapors, and/or gases to be transported between the components in a controlled fashion (i.e., without leakage). Coupling two or more components such that they are in flow communication with each other can involve any suitable method known in the art, such as with the use of welds, flanged conduits, gaskets, and bolts. Two or more components may also be coupled together via other components of the system that may separate them.

In order to aid in describing the invention, directional terms may be used in the specification and claims to describe portions of the present invention (e.g., upper, lower, left, right, etc.). These directional terms are merely intended to assist in describing and claiming the invention, and are not intended to limit the invention in any way. In addition, reference numerals that are introduced in the specification in association with a drawing figure may be repeated in one or more subsequent figures without additional description in the specification in order to provide context for other features.

Figure 1A:
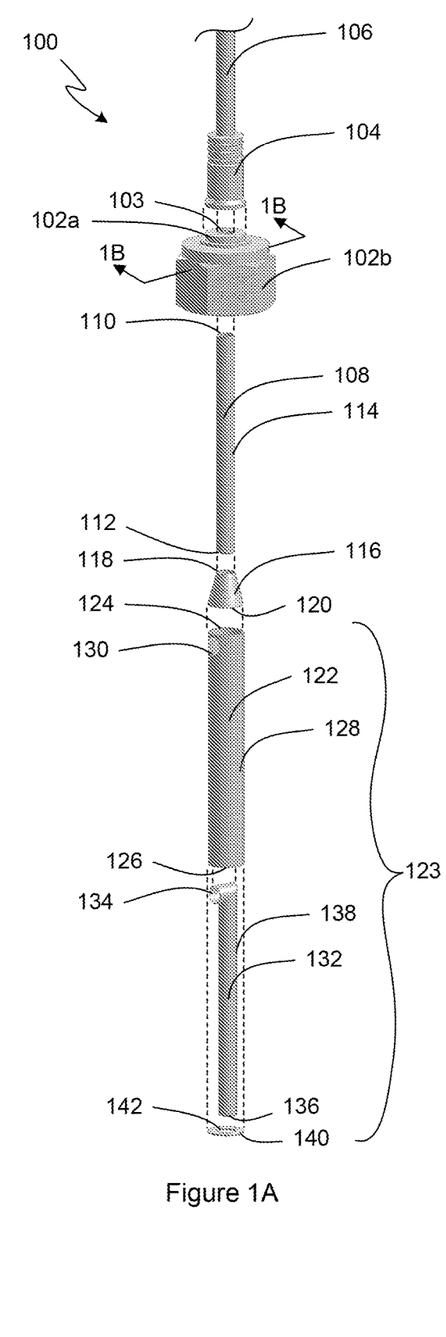
FIG. 1A is an exploded perspective view of an ultrasonic probe in accordance with an exemplary embodiment.
Figure 1B:
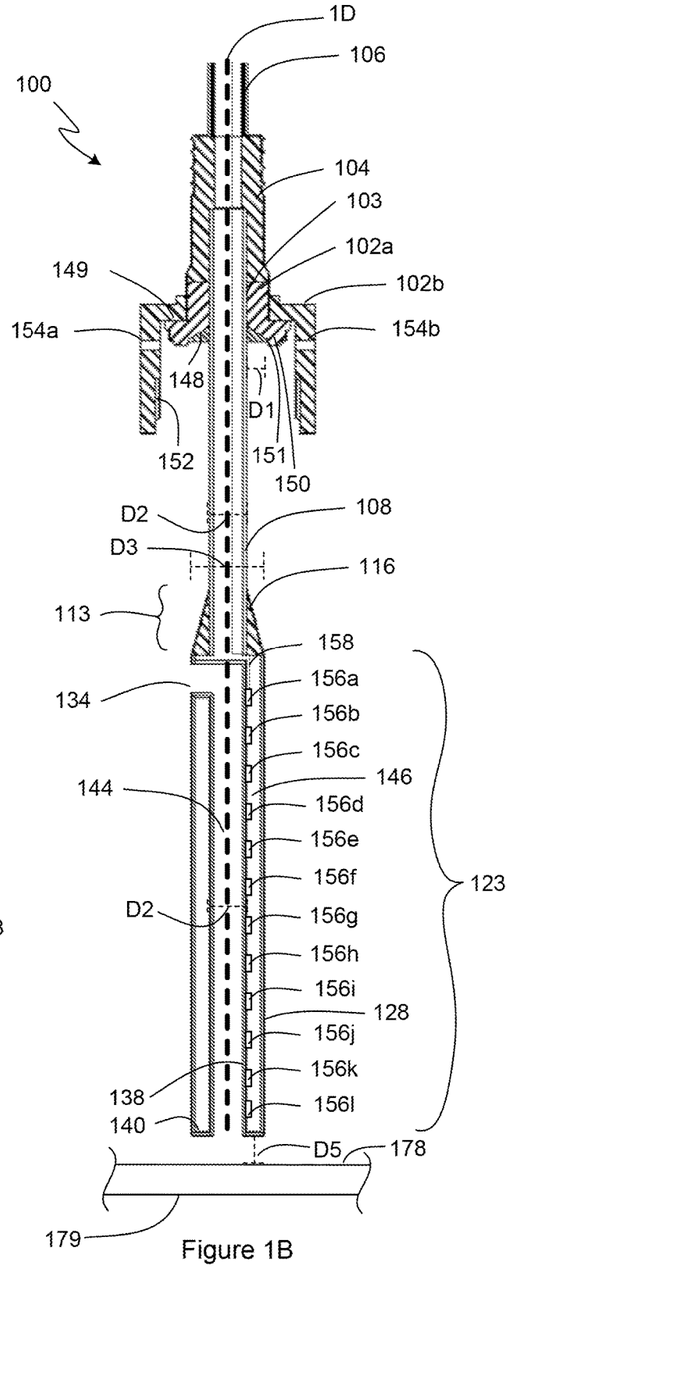
FIG. 1B is a non-exploded sectional view, taken along line 1B-1B, of the ultrasonic probe of FIG. 1A.

FIGS. 1A and 1B show an ultrasonic probe 100 in accordance with an exemplary embodiment of the present invention. More specifically, FIG. 1A shows an exploded perspective view of the ultrasonic probe 100 and FIG. 1B shows a non-exploded sectional view of the ultrasonic probe 100 taken along line 1B-1B of FIG. 1A. Dashed line 1D indicates a longitudinal axis of probe 100.

The ultrasonic probe 100 comprises seal fitting members 102a and 102b, a flexible connector 104, a cable sheath 106, a neck tube 108 having a shoulder portion 113, and a barrel 123. As discussed in greater detail herein, the seal fitting members 102a and 102b are portions of a seal fitting assembly 157 that secures the ultrasonic probe 100 to a container 159. In exemplary embodiments, such as described in related co-pending U.S. patent application Ser. No. 14/163,407 filed Jan. 24, 2014, the teachings of which are incorporated by reference herein, the seal fitting assembly 157 is a face seal fitting assembly, where the seal fitting member 102a is a face seal fitting gland having a through hole 103 and the seal fitting member 102b is a standard sized face seal fitting having a three-quarter-inch (19.1 mm) hex nut. In this embodiment, the seal fitting member 102b rests on a lip 149 of the seal fitting member 102a and can be rotated relative to the seal fitting member 102a about an axis drawn through the through hole 103. In alternative embodiments, as will be apparent to those of ordinary skill in the art, the seal fitting members 102a and 102b can have other dimensions and features, such as a longer gland, a half-inch (12.7 mm) or a non-standard size face seal fitting, and/or a seal fitting member 102b that is bonded to the seal fitting member 102a. Similarly, other types of fittings can be used for seal fitting assembly 157, such as, for example, a surface mount C-seal.

The seal fitting member 102a is coupled to the flexible connector 104 and the cable sheath 106. The neck tube 108 comprises an upper end 110 that defines an upper opening, a lower end 112 that defines a lower opening, and a sidewall 114. In this embodiment, the shoulder portion 113 of the neck tube 108 comprises a shoulder tube 116 having an upper end 118 that defines an upper opening and a lower end 120 that defines a lower opening. In exemplary embodiments such as shown in FIG. 1A and as described in related co-pending U.S. patent application Ser. No. 14/163,407, the shoulder tube 116 is conical in shape and provides a smooth transition from the neck tube 108 to the outer tube 122 of the barrel 123. The lower end 112 of the neck tube 108 is disposed within the shoulder tube 116 and the shoulder tube 116 is coupled to the sidewall 114 of the neck tube 108. In other embodiments, the entire neck tube 108, including the shoulder portion 113, can be formed of a single unitary part. The upper end 110 of the neck tube 108 is disposed within the through hole 103 of the seal fitting member 102a and within the flexible connector 104.

The barrel 123 comprises an outer tube 122, an inner tube 132, and a disc cap 140. The outer tube 122 has an upper end 124 that defines an upper opening, a lower end 126 that defines a lower opening, a sidewall 128, and a through hole 130 disposed in the sidewall 128 near the upper end 124. The upper end 124 of the outer tube 122 is coupled to the lower end 120 of the shoulder tube 116.

The inner tube 132 comprises an upper end 124 that defines an upper opening, a lower end 136 that defines a lower opening, and a sidewall 138. In this exemplary embodiment, the upper end 134 defines an upper opening that is approximately perpendicular to the lower opening defined by the lower end 136. The inner tube 132 defines a conduit 144 (see FIG. 1 B). In should be understood that, in other embodiments of the invention, the conduit may not be fully enclosed, as is the case with ultrasonic probe 100. For example, in a probe having a "tuning fork" style barrel (i.e., having two spaced-apart members extending downwardly) the conduit could comprise a space located between the two spaced-apart members.

The disc cap 140 comprises an inner rim 142 that defines an opening. In an assembled configuration, the entirety of the inner tube 132 is disposed within the outer tube 122, the upper end 134 of the inner tube 132 is aligned with the through hole 130 disposed in the sidewall 128, and the lower end 136 of the inner tube 132 is aligned with the lower end 126 of the outer tube 122. The upper end 134 of the inner tube 132 is coupled to the sidewall 128. The disc cap 140 is coupled to the lower end 126 of the outer tube 122 and the lower end 136 of the inner tube 132, thereby coupling the lower end 126 of the outer tube 122 to the lower end 136 of the inner tube 132.

Figure 2A:
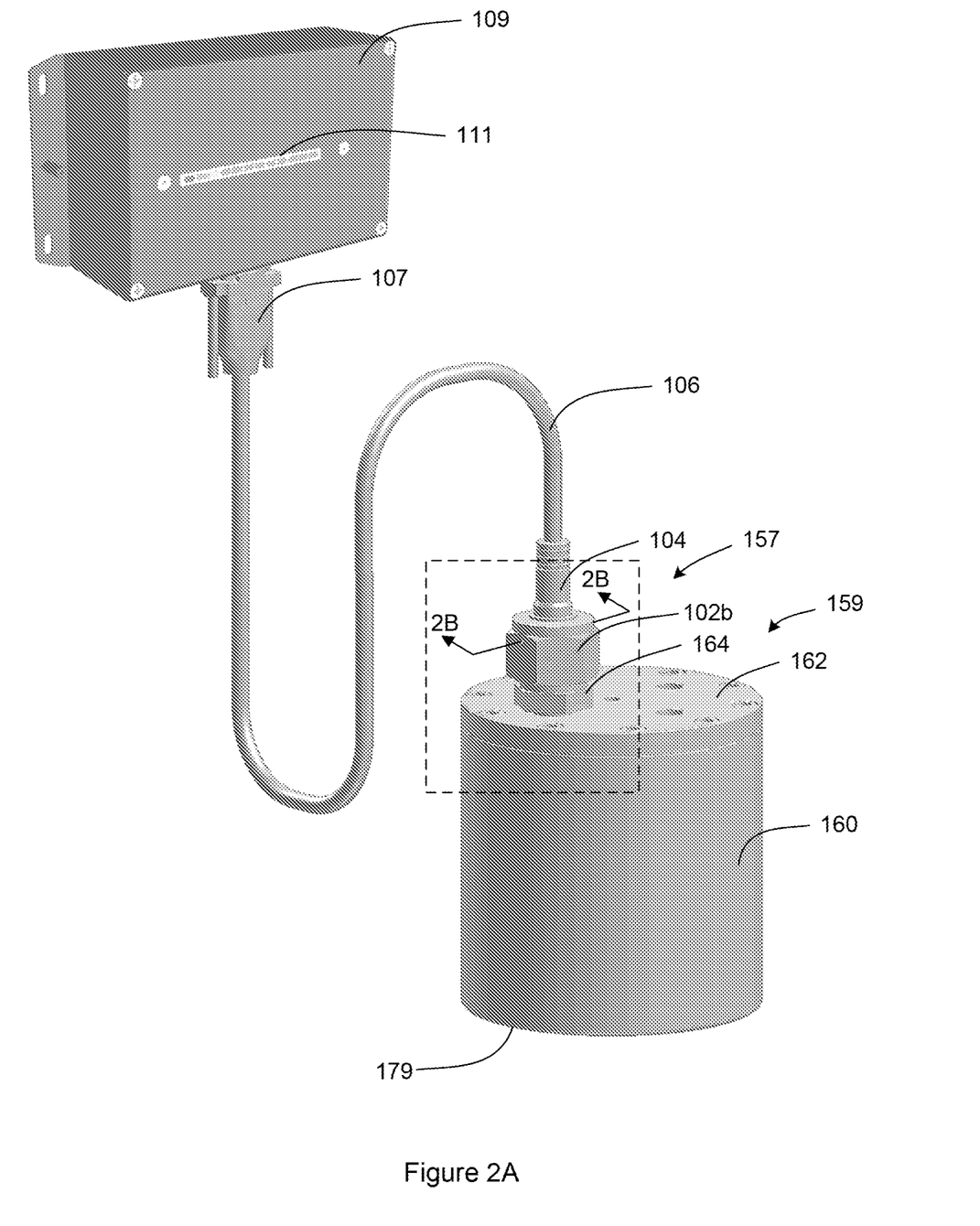
FIG. 2A is a perspective view of the ultrasonic probe of FIGS. 1A and 1B installed on a container in accordance with an exemplary embodiment.

The conduit 144 is disposed within the barrel 123 and has a lower opening defined by the lower end 136 of the inner tube 132 (the lower opening can also be regarded as being defined by the inner rim 142 of the disc cap 140) (see FIG. 1B). When the barrel 123 is inserted into a container (see container 159 of FIG. 2), the conduit 144 is in flow communication with the internal volume of the container that holds liquid such that the liquid can flow through the conduit 144.

The sidewall 128 of the outer tube 122 and the sidewall 138 of the inner tube 132 define an internal volume 146 (i.e., a compartment) therebetween that is also bounded by the disc cap 140, as shown. The internal volume 146 is isolated from the conduit 144 (i.e., the internal volume 146 is not in flow communication with the conduit 144) such that any liquid flowing through the conduit 144 cannot enter the internal volume 146.

A plurality of ultrasonic sensors 156 is disposed within the internal volume 146 of the barrel 123. In one exemplary embodiment, the plurality of ultrasonic sensors 156 includes twelve (12) ultrasonic sensors 156a through 156l that are coupled to the sidewall 138 of the inner tube 132. In this embodiment, each of the plurality of ultrasonic sensors 156a through 156l are bonded to sidewall 138 with an epoxy. Thus, ultrasonic sensors 156a through 156l are oriented to emit sound waves in the direction facing sidewall 138 (e.g., perpendicular to longitudinal axis 1D). Other suitable means for coupling can also be used, such as double-sided tape or other adhesives. In other embodiments, the plurality of ultrasonic sensors 156 can include a greater or lesser number of sensors. Preferably the plurality of ultrasonic sensors 156 includes at least 5 ultrasonic sensors. The plurality of ultrasonic sensors 156 might be implemented with any suitable ultrasonic sensors that are known to those of ordinary skill in the art, such as, for example, piezoelectric crystals. Each ultrasonic sensor of the plurality of ultrasonic sensors 156a through 156l is oriented to emit sound waves through the sidewall 138 and the conduit 144 (and any liquid present therein) and detect the sound waves that are echoed back. Each ultrasonic sensor of the plurality of ultrasonic sensors 156*a* through 156*l* includes wiring 158 (comprising at least one wire) that extends from the internal volume 146, through the neck tube 108, and through the cable sheath 106. The wiring 158 is terminated at a connector 107 that is plugged into a controller 109 (see FIG. 2).

Controller 109 is a programmable data processing device that transmits electronic signals to the plurality of ultrasonic sensors 156, receives electronic signals from the plurality of ultrasonic sensors 156, and determines the level of liquid within container 159 into which the ultrasonic probe 100 is inserted. In this embodiment, controller 109 comprises one or more microprocessors (not shown), a power supply (not shown), at least one input/output port (not shown) to receive connector 107, and a light-emitting-diode (LED) meter or liquid crystal display (LCD) 111 that provides a visual indication of the amount of liquid within the container. In alternative embodiments, controller 109 can include other input/output ports and/or other aural and visual mechanisms for indicating the level of liquid within the container. Similarly, controller 109 may be implemented with any type of programmable data processing device, including a personal computer executing control software.

For each ultrasonic sensor of the plurality of ultrasonic sensors 156, controller 109 transmits an electronic signal (e.g., one or more electronic pulses) to the ultrasonic sensor via the wiring 158, which causes the ultrasonic sensor to emit sound waves (i.e., the piezoelectric crystal oscillates). The ultrasonic sensor then receives echoed sound waves and converts the echoed waves into an electronic signal that is transmitted back to controller 109 via wiring 158. In a preferred embodiment, controller 109 transmits a series of multiple pulses (e.g., 20 pulses) to an individual one of the ultrasonic sensors 156, which emits sound waves corresponding to the pulses. Controller 109 waits for a predetermined time period (e.g., a time window) to allow the ultrasonic sensor to receive any echoed waves returning from the emitted sound waves. If an echoed wave is received by the ultrasonic sensor, the sensor generates a signal that is transmitted to controller 109 (e.g., the piezoelectric crystal oscillates at a frequency and intensity based on the frequency and intensity of the received echoed waves). Based on whether any echoed waves are received in the time window (e.g., based on the frequency and/or intensity of any signal generated by the ultrasonic sensor), controller 109 determines whether liquid is present in conduit 144 at the given ultrasonic sensor. Typically, when no liquid is present, little or no echoed waves will be sensed by the ultrasonic sensor in the time window (e.g., the intensity of the piezoelectric crystal oscillation would be very low, or none at all), and when liquid is present, the echoed waves are generally similar in frequency and intensity as the transmitted waves. After the time window expires, controller 109 transmits a series of multiple pulses to a next one of the ultrasonic sensors to sense the presence of liquid at a next level of ultrasonic probe 100.

As previously discussed, controller 109 interprets the intensity of the received signal as well as the time that elapsed between sending the electronic signal to the ultrasonic sensor and receiving the electronic signal from the ultrasonic sensor to determine whether there is liquid at the portion of conduit 144 at which that particular sensor is disposed. Accordingly, by using the plurality of ultrasonic sensors 156, the controller 109 can determine the level of liquid along the length of the conduit 144 and therefore the amount of liquid within the container into which the barrel 123 is inserted. Each sensor of the plurality of ultrasonic sensors 156 might be represented by an LED in the LED meter 111 to provide a visual indication of the amount of liquid within the container (e.g., each LED is illuminated only when liquid is detected by a particular sensor).

Since the distance, D5, between disc cap 140 (e.g., the bottom end of ultrasonic probe 100) and the inner surface 178 of the base 179 of container 159 is a non-zero value to allow liquid to flow into conduit 144 to be measured by ultrasonic probe 100, the bottom ultrasonic sensor (e.g., ultrasonic sensor 156*l*) of the plurality of ultrasonic sensors 156 that is oriented to emit sound waves through the sidewall 138 and the conduit 144 will be some distance above the inner surface 178 of the base of the container. Therefore, ultrasonic probe 100 will have some inherent inaccuracy in measuring the precise level of the liquid within container 159. Therefore, some embodiments of ultrasonic probe 100 might employ an ultrasonic sensor oriented to emit sound waves through disc cap 140 to the base of container 159 to determine the level of liquid present in the space, D5, between disc cap 140 (e.g., the bottom end of ultrasonic probe 100) and inner surface 178 of the base 179 of container 159 such as described in related copending U.S. Provisional Patent Application No. 62/043,668, filed Aug. 29, 2014.

The controller 109 can be programmed to transmit signals to, and receive signals from, less than all of the ultrasonic sensors 156*a* through 156*l* of the plurality of ultrasonic sensors 156 at the same time. This feature eliminates the need for the wiring 158 for the plurality of ultrasonic sensors 156 to be individually shielded and also allows the ultrasonic sensors 156*a* through 156*l* to be disposed closer together. In prior art systems, the wiring that connects the ultrasonic sensors to a controller is typically individually shielded to protect against interference (i.e., crosstalk) that results from electronic signals being transmitted to and from all of the ultrasonic sensors in the probe at the same time. For example, the wiring for each ultrasonic sensor in a typical prior art design may include a coaxial cable in which the inner conductor serves as the signal line to the ultrasonic sensor and the outer shield serves as the ground (e.g., grounded to a steel tube of the probe) and the signal return from the ultrasonic sensor. In prior art systems, the ultrasonic sensors within the probe must also be spaced father apart to avoid interference that results from the ultrasonic sensors simultaneously emitting sound waves. Each of these characteristics (i.e., added bulk from multiple shielded cables and greater spacing between sensors) limits the number of ultrasonic sensors that can be disposed in a probe without increasing the size of the probe and related hardware.

In a preferred embodiment, controller 109 is programmed or otherwise operatively configured to transmit signals to, and receive signals from, one ultrasonic sensor of the plurality of ultrasonic sensors 156 at a time. For example, controller 109 can be programmed to first transmit an electronic signal to the ultrasonic sensor 156*a* and await receipt of the return signal from the ultrasonic sensor 156*a*, then transmit an electronic signal to the ultrasonic sensor 156*b* and await receipt of the return signal from the ultrasonic sensor 156*b*, and so on for each ultrasonic sensor of the plurality of ultrasonic sensors 156. Upon having transmitted an electronic signal to, and received an electronic signal from, each of the plurality of ultrasonic sensors 156 a first time (for example, beginning with ultrasonic sensor 156*a* and ending with ultrasonic sensor 156*l*, although other orders are possible), the controller 109 repeats the sequence and transmits an electronic signal to, and receives an electronic signal from, the ultrasonic sensor 156*a* and each of the plurality of ultrasonic sensors 156 a second time, and so on for as long as the ultrasonic probe 100 is being operated. In this manner, the potential for interference between the wiring 158 for each ultrasonic sensor 156a through 156l and between the ultrasonic sensors themselves is greatly reduced or eliminated because the ultrasonic sensors 156a through 156l are not all simultaneously emitting or receiving sound waves and the wiring 158 for each of the ultrasonic sensors 156a through 156l is not simultaneously carrying electronic signals.

This method of operating the plurality of ultrasonic sensors 156 eliminates the need for the wiring 158 for each ultrasonic sensor 156a through 156l to be individually shielded and the ultrasonic sensors 156a through 156l can be disposed closer together (i.e., even closer than is shown in FIG. 1B) than in prior art systems, both of which enable a greater number of ultrasonic sensors to be disposed within the barrel 123. In an exemplary configuration, the wiring 158 comprises a multi conductor shielded cable having a plurality of inner conductors that are not individually shielded, where a separate inner conductor is connected to each ultrasonic sensor of the plurality of ultrasonic sensors 156 to serve as the signal line, and an outer shield of the multi conductor shielded cable serves as a common return line and ground for all of the ultrasonic sensors of the plurality of ultrasonic sensors 156. For example, a coaxial cable can be used as the multi conductor shielded cable, where the inner conductors are connected to the plurality of ultrasonic sensors 156 to serve as the signal lines, and the outer shield of the coaxial cable serves as the common return line. In a preferred embodiment, the multi-conductor shielded cable is a commercially available cable such as a model 83562 cable manufactured by Belden, Inc. of St. Louis, Mo., USA.

The neck tube 108 is disposed within the seal fitting members 102a and 102b and the flexible connector 104. The neck tube 108 is secured to the seal fitting member 102a by a fusion weld (i.e., a bead) made within the weld zone 148. Preferably, the weld occupies only a portion of the weld zone 148 and is made where the sidewall 114 of the neck tube 108 abuts the seal fitting member 102a. The seal fitting member 102a includes a protruding sealing surface (i.e., a seal face) 150 that extends around the neck tube 108. The protruding sealing surface 150 has an inner edge 151 that is separated from the sidewall 114 of the neck tube 108 by a distance D1. In order to prevent impairment of the protruding sealing surface 150 by a weld within the weld zone 148 (e.g., welding material can create a raised surface and/or the heat of welding can deform the protruding sealing surface 150), distance D1 is preferably at least 2.0 mm and, more preferably, at least 6.0 mm. The seal fitting member 102b includes a threaded region 152 that engages an opposite threaded region 166 of another seal fitting member 164 of the seal fitting assembly 157. Ultrasonic probe 100 might also include testing ports (not shown) used for leak detection when the ultrasonic probe 100 is secured to the container 159.

The barrel 123 has an outer diameter D3 (i.e., the outer diameter of the outer tube 122). The neck tube 108 and the inner tube 132 have an outer diameter D2 that is less than the outer diameter D3 of the barrel 123. The larger outer diameter D3 of the barrel 123 relative to the outer diameter D2 of the inner tube 132 provides an increased amount of space within the internal volume 146 that is necessary to house the increased number of ultrasonic sensors 156a through 156l and their respective wiring 158. Preferably, the ratio of the outer diameter D2 of the inner tube 132 to the outer diameter D3 of the barrel 123 is less than or equal to 0.95. More preferably, the ratio of the outer diameter D2 of the inner tube 132 to the outer diameter D3 of the barrel 123 is less than or equal to 0.95 and greater than or equal to 0.3. More preferably, the ratio of the outer diameter D2 of the inner tube 132 to the outer diameter D3 of the barrel 123 is less than or equal to 0.8, and the outer diameter D3 of the barrel 123 is no greater than 0.827 inches (21.0 mm). More preferably, the ratio of the outer diameter D2 of the inner tube 132 to the outer diameter D3 of the barrel 123 is less than or equal to 0.8 and greater than or equal to 0.4. More preferably, the outer diameter D2 of the inner tube 132 is approximately five-sixteenths of an inch (7.9 mm), and the outer diameter D3 of the barrel 123 is approximately five-eighths of an inch (15.9 mm). Preferably, there exists a minimum distance between the sidewall 128 of the outer tube 122 and the sidewall 138 of the inner tube 132 of at least 0.10 inches (2.5 mm) where the plurality of ultrasonic sensors 156 includes at least four ultrasonic sensors, and a minimum distance of at least 0.15 inches (3.8 mm) where the plurality of ultrasonic sensors 156 includes the twelve (12) ultrasonic sensors 156a through 156l.

In other embodiments, such as described in related co-pending U.S. patent application Ser. No. 14/163,407, ultrasonic probe 100 might employ different constructions of neck tube 108 and barrel 123. For example, in some embodiments, such as described in related co-pending U.S. patent application Ser. No. 14/163,407, shoulder portion 113 of neck tube 108 is formed by sidewall 114 rather than as a separate piece and is integral with the remainder of the neck tube 108 (i.e., the neck tube 108 and shoulder portion 113 are a single piece of material), for example by shoulder portion 113 having a bell shape that transitions from the outer diameter D2 of neck tube 108 to the outer diameter D3 of neck tube 108, which is also the outer diameter of barrel 123.

Further, other embodiments described in related co-pending U.S. patent application Ser. No. 14/163,407 might employ an outer tube 122 of ultrasonic probe 100 that does not include a through hole disposed in the sidewall 128, and where upper end 124 of outer tube 122 is not coupled to a shoulder tube or to the lower end 112 of the neck tube 108. Instead, the upper end 134 of the inner tube 132 might be aligned with a through hole disposed in the sidewall of a collar that is coupled to the lower end 112 of neck tube 108 and the upper end 124 of outer tube 122. The collar might enable barrel 123 to be constructed as one or more assemblies, which might advantageously allow the plurality of ultrasonic sensors 156 to be tested prior to completing assembly of barrel 123. In addition, this feature is advantageous because most of the components of the barrel 123 can be welded together prior to installing the plurality of ultrasonic sensors 156, where the heat from welding might otherwise damage the plurality of ultrasonic sensors 156 and/or the bonds which hold the plurality of ultrasonic sensors 156 in place within the internal volume 146.

FIG. 2A shows a perspective view of the ultrasonic probe 100 installed on a container 159 in accordance with an exemplary embodiment of the present invention. The ultrasonic probe 100 includes the controller 109 and the LED meter 111, as previously discussed. The container 159 comprises a body 160, an upper portion 162, and a seal fitting member 164 coupled to the upper portion 162. As will be apparent to those of ordinary skill in the art, the container 159 may include other components that are not shown in FIG. 2 for clarity and illustrative purposes (e.g., additional valves and hardware for refilling the container 159). The body 160 and upper portion 162 define an internal volume that can contain fluid. In this embodiment, the upper portion 162 is a lid coupled to the body 160. In other embodiments, the upper portion 162 can be an integral part of the body 160. The seal fitting member 164, like the seal fitting members 102a and 102b, is a portion of the seal fitting assembly 157 that secures the ultrasonic probe 100 to the container 159. In this exemplary embodiment, the components of the container 159 are composed of one or more metals.

Figure 2B:
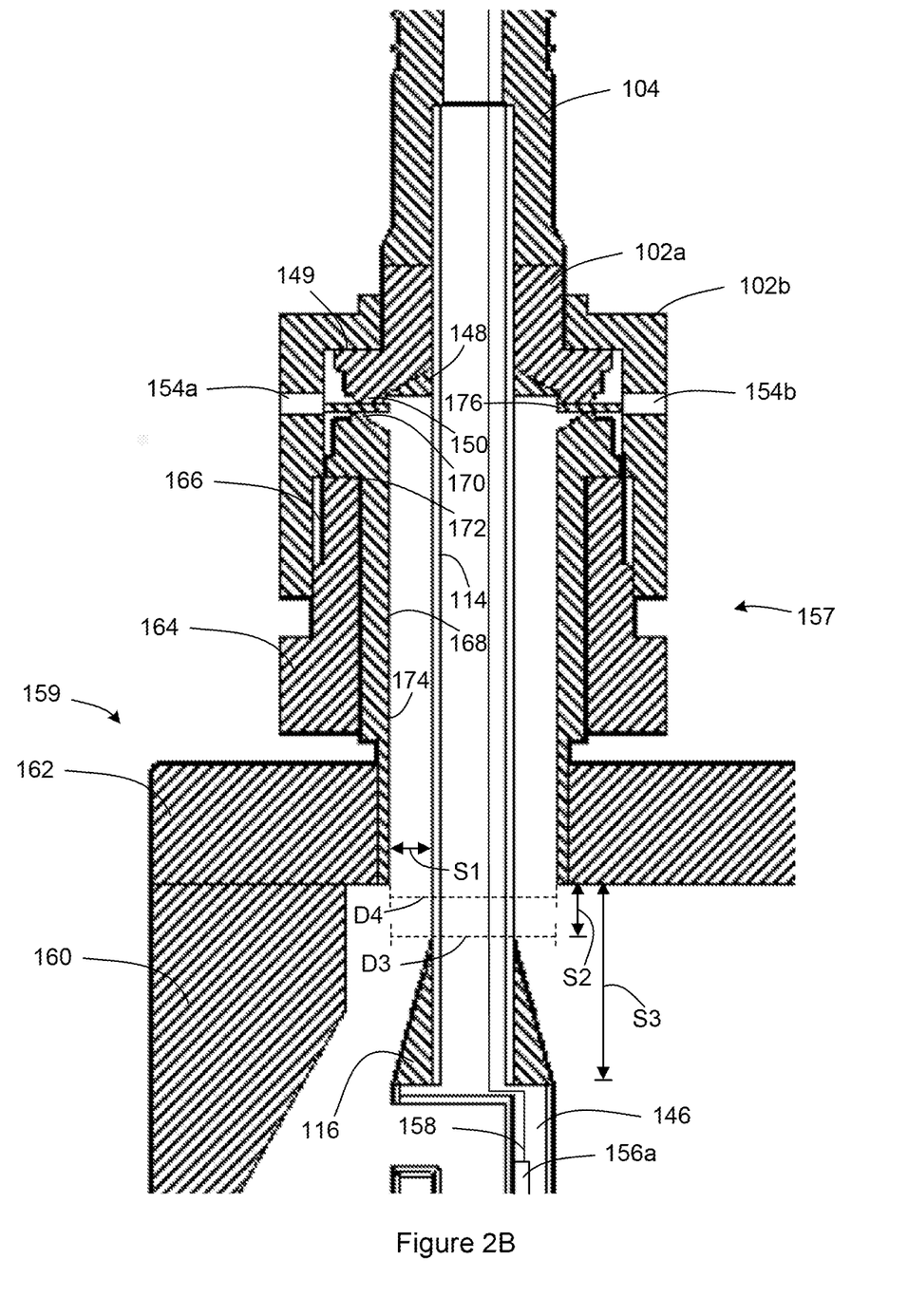
FIG. 2B is an enlarged, partial sectional view, taken along line 2B-2B, of portions of the ultrasonic probe and container shown within the dashed-line area of FIG. 2A.

FIG. 2B shows a cross sectional view of the portion ultrasonic probe 100 and container 159 within the dashed box of FIG. 2A, taken along line 2B-2B. As shown, stem 168 is disposed in a hole in the upper portion 162 of body 160 of container 159. In this embodiment, stem 168 is a face seal fitting gland that is bonded (e.g., welded) to the upper portion 162 of body 160. Stem 168 comprises a protruding sealing surface 170, a lip 172, and a sidewall 174. Sidewall 174 of stem 168 has an inner diameter D4 that is greater than the outer diameter D3 of barrel 123 such that barrel 123 can be inserted into stem 168. Seal fitting member 164 is disposed around the stem 168 and comprises a threaded region 166 that engages the threaded region 152 of the seal fitting member 102b (i.e., the threaded regions 152 and 166 have complimentary threading such as female and male threading, respectively). A metal gasket 176 having a through hole is disposed between the protruding sealing surface 150 of the seal fitting member 102a and the protruding sealing surface 170 of the stem 168.

In a fully installed configuration, barrel 123 is inserted through metal gasket 176 and stem 168 such that the barrel is disposed inside of container 159 and the neck tube is disposed within stem 168 and metal gasket 176. The threaded region 152 of the seal fitting member 102b is then threaded onto the threaded region 166 of the seal fitting member 164 such that the seal fitting member 102b engages (i.e., presses against) the lip 149 of the seal fitting member 102a, the seal fitting member 164 engages the lip 172 of the stem 168, and the metal gasket 176 is compressed between the protruding sealing surface 150 of the seal fitting member 102a and the protruding sealing surface 170 of the stem 168. In this manner, the protruding sealing surface 170, the protruding sealing surface 150, and the metal gasket 176 form a metal-on-metal seal that prevents fluid (i.e., liquid, vapor, and/or gas) from escaping or entering the container 159.

In the fully installed configuration, in this exemplary embodiment, a distance S1 exists between the sidewall 114 of neck tube 108 and sidewall 174 of stem 168; a distance S2 exists between the upper portion 162 (i.e., lid) of the container 159 and the upper end 118 of shoulder tube 116, and the upper end 118 of the shoulder tube 116 is located below the lower-most portion of the stem 168; and a distance S3 exists between the upper portion 162 of container 159 and the upper end 124 of outer tube 122 of barrel 123. Preferably, the distance S2 is greater than or equal to 0.10 inches (2.5 mm) and the distance S1 is greater than or equal to 0.70 mm. Generally, the distances S1, S2 and S3 are preferably large enough to allow fluid to travel in between sidewall 114 of neck tube 108 and sidewall 174 of the stem 168, but also drain back down and return into container 159 under the force of gravity. Stated differently, the distances S1, S2 and S3 are preferably large enough to avoid capillary action in which fluid is retained between sidewall 114 of neck tube 108 and sidewall 174 of stem 168. Avoiding such capillary action helps maximize the usable quantity of chemical reagent that can be drawn out of container 159 for use, and also ensures that during cleaning of container 159 and ultrasonic probe 100 in the fully installed configuration, no residual chemicals are left behind to potentially contaminate fresh chemical reagent that is later added to container 159.

Thus, the described embodiments of an ultrasonic probe satisfy a need in the art for an ultrasonic probe having increased quantities of ultrasonic sensors that can be used with existing container fittings having standardized dimensions. The barrel 123 has an outer diameter D3 that provides an increased amount of space within the internal volume 146 that is necessary to house the increased number of ultrasonic sensors 156a through 156l and their respective wiring 158. In prior art ultrasonic probe designs, the barrel typically extends into the seal fitting assembly. An increased outer diameter of the barrel would therefore require a larger and/or non-standard seal fitting assembly, or modifying a standard seal fitting assembly such as by boring out a through hole (e.g., through hole 103 of the seal fitting member 102a) so it can receive the larger barrel diameter. However, non-standard fitting assemblies are typically much more expensive than their standardized counterparts and may also require the use of other non-standardized components. Non-standard fitting assemblies also do not benefit from the extensive testing and proven history of standardized fitting assemblies for use in semiconductor manufacturing processes. Larger seal fittings also require more space on the lid of the container (e.g., upper portion 162) and can make obtaining a tight seal more difficult. Finally, the inventors have found that attempts to modify standard seal fitting assemblies to receive a larger barrel diameter can negatively affect the structural integrity of the ultrasonic probe and/or the seal fitting assembly. For example, referring to FIG. 1B, if the through hole 103 in the seal fitting member 102a was bored out to receive the larger outer diameter D2 instead of the outer diameter D2 of the neck tube 108, the distance D1 would be decreased. As a result, the size of the weld zone 148 would also be decreased, and the heat of welding could damage (i.e., warp) the protruding sealing surface 150 and negatively affect the integrity of the seal made between the protruding sealing surface 150 and the metal gasket 176.

Unlike prior art probe designs, the barrel 123 of the ultrasonic probe 100 does not extend into the seal fitting member 102a. Instead, the barrel 123 is coupled to the neck tube 108, which is in turn coupled to the seal fitting member 102a. The stem 168 is bored out such that the inner diameter D4 of the stem 168 is greater than the outer diameter D3 of the barrel 123 and the barrel 123 can be inserted into the stem 168. The neck tube 108 has an outer diameter D2 that is less than the outer diameter D3 of the barrel 123 (i.e., the ratio of D2 to D3 is less than one), which enables the through hole 103 of the seal fitting members 102a to have a smaller bore size, as opposed to requiring a larger seal fitting (e.g., a 1 inch seal fitting) or boring out the through hole 103 in the seal fitting member 102a to accommodate the increased outer diameter D3 of the barrel 123. The smaller outer diameter D2 of the neck tube 108 also provides the necessary distance D1 to have a sufficiently large weld zone 148 such that the neck tube 108 and the seal fitting member 102a can be welded together without welding material and/or welding heat impairing the protruding sealing surface 150. Preventing such damage to the protruding sealing surface 150 is critical to maintaining the integrity of the seal between the protruding sealing surface 150 and the metal gasket 176, and therefore maintaining the assay (purity) of the chemical reagent for use in semiconductor manufacturing.

Figure 3:
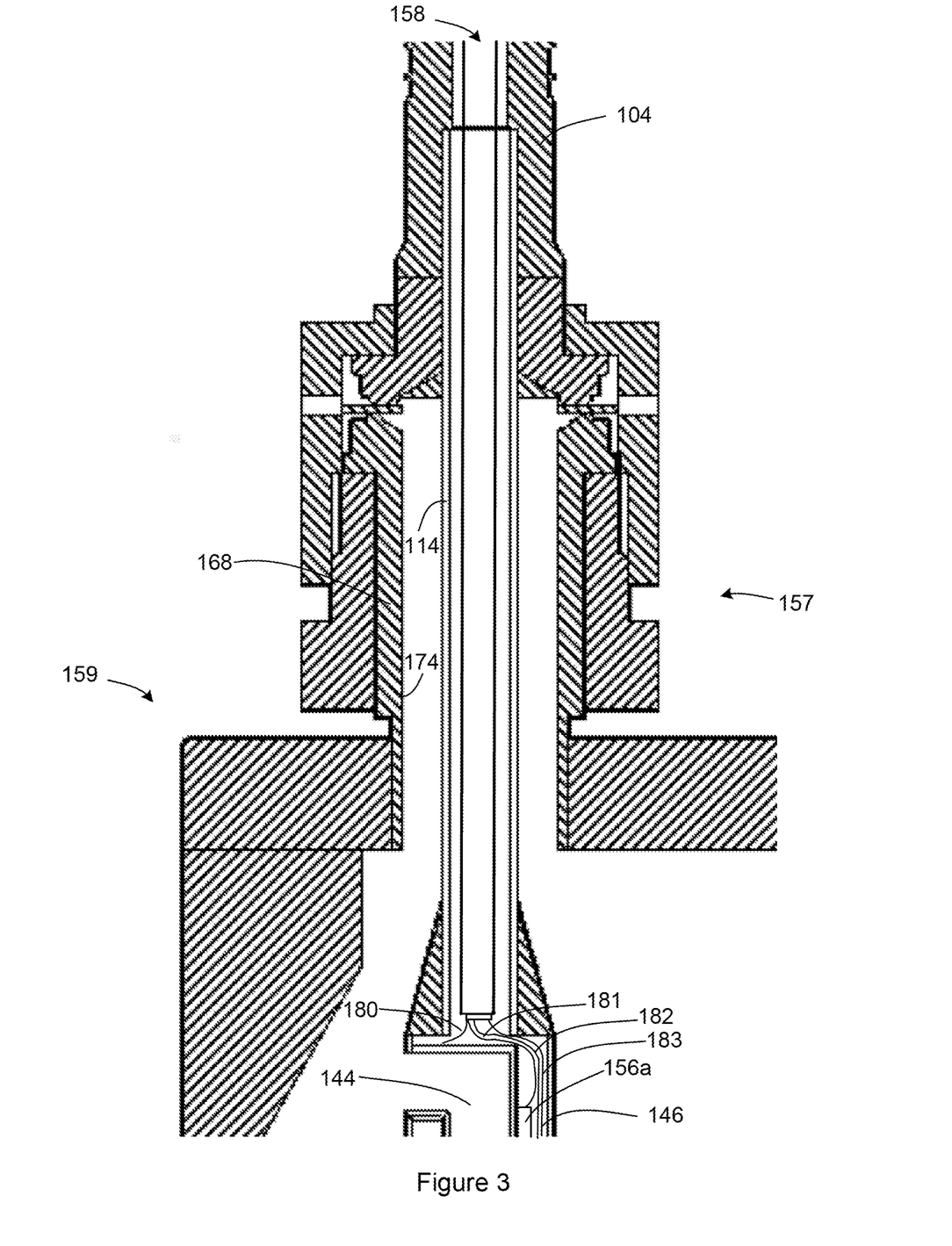
FIG. 3 is the enlarged, partial sectional view, taken along line 2B-2B, of FIG. 2B, showing wiring of sensors of the ultrasonic probe in accordance with another exemplary embodiment.

FIG. 3 shows additional detail of wiring 158 to the plurality of ultrasonic sensors 156. As described herein, controller 109 sequentially transmits an electronic signal to one of the ultrasonic sensors 156 and awaits receipt of a return signal from the ultrasonic sensor. As shown in FIG. 3, wiring 158 is a multi conductor shielded cable that includes a plurality of inner wires, shown as wires 181, 182, and 183, and an outer shield, shown as cable shield 180. As shown, each of wires 181, 182 and 183 are individually insulated (e.g., electrically isolated from each other) but are not individually shielded. As shown in FIG. 3, wire 181 is connected as a signal line to ultrasonic sensor 156a. Wires 182 and 183 are connected as signal lines to subsequent ones of the plurality of ultrasonic sensors 156 (not shown in FIG. 3). As further shown in FIG. 3, cable shield 180 is electrically connected to the sidewall 138 of inner tube 132. Since, as described herein, cable shield 180 is employed as a common return line for echo signals from all of the ultrasonic sensors 156 to return to controller 109, by electrically connecting cable shield 180 to sidewall 138, a common wire does not need to be provided to each ultrasonic sensor, rather, the common connection to each ultrasonic sensor can be electrically connected to sidewall 138. This allows ultrasonic sensors 156 to be disposed closer together than in prior art systems, simplifies the construction of ultrasonic probe 100, and reduces the number of wires in, and size of, wiring 158. In alternative embodiments, wiring 158 might include a 2 layer outer shield, where one of the shield layers is a common return and the other shield layer is ground. For example, in an exemplary embodiment an inner shield layer is employed as the common return, and an outer shield layer is employed as the ground.

As described herein, controller 109 might sequentially pulse each of ultrasonic sensors 156 at a predetermined frequency. For example, in one embodiment, controller 109 pulses ultrasonic sensors 156 at a frequency of 100 kHz, although other frequencies of operation are possible. Although the sequential pulsing of the ultrasonic sensors 156 could be in any order (e.g., top-to-bottom, bottom-to-top, or any other order), in one embodiment, controller 109 sequentially pulses the ultrasonic sensors from bottom-to-top of ultrasonic probe 100 (e.g., from ultrasonic sensor 156l to ultrasonic sensor 156a). In exemplary embodiments, once one sensor is determined to be "dry" (e.g., liquid is not detected by a given ultrasonic sensor), controller 109 could optionally be programmed to expect that all sensors located physically above the "dry" sensor should also be "dry" (e.g., the liquid level within the container is below the level of the first "dry" ultrasonic sensor). Thus, in some embodiments, if a sensor above the expected liquid level (e.g., above a "dry" sensor) is returning a "wet" status (e.g., the sensor indicates the presence of liquid), an error condition might be reported by controller 109 (e.g., on LED display 111) such that an operator can verify the liquid level within the container to determine if ultrasonic probe 100 is malfunctioning.

In exemplary embodiments, controller 109 operates LED display 111 to display a status corresponding to each ultrasonic sensor 156. For example, if a given one of ultrasonic sensors 156 is indicating that liquid is present ("wet"), the corresponding indicator of LED display 111 might be lit solidly. Similarly, if a given one of ultrasonic sensors 156 is indicating that liquid is not present ("dry"), the corresponding indicator of LED display 111 might be lit, but blinking. If controller 109 cannot communicate with ultrasonic probe 100, or the container is entirely empty of liquid, all of the indicators of LED display 111 might blink. Alternative arrangements are possible, for example if the "wet" indicator is in a first LED color (e.g., green), while the "dry" indicator is in a second LED color (e.g., red). Similarly, a graphical liquid level representation could be shown on an LCD screen or other graphical user output device.

Ultrasonic probe 100 is employed to measure a level of liquid within a container that might be subject to splashing, churning, bubbling, vaporization/condensation or other physical disturbances that could temporarily alter the liquid level sensed by ultrasonic probe 100. Therefore, to limit fluctuation in the liquid level displayed on LED display 111, controller 109 might employ hysteresis and/or delay to more accurately report the liquid level within the container. For example, in some embodiments, controller 109 might delay a predetermined amount of time before changing a reading of a particular sensor from "wet" to "dry" (indicating a reduction in liquid level), which would allow controller 109 to receive multiple readings from the given ultrasonic sensor 156 before changing the liquid level indication, and hopefully avoiding any temporary disturbance in the liquid level of the container. In an exemplary embodiment, controller 109 delays 5 seconds before changing a reading of a particular sensor from "wet" to "dry". This means that, once the controller 109 receives a sensor reading of "dry" from a sensor that was previously reading "wet", that sensor would have to read "dry" for 5 seconds before the controller 109 would change the LED display 111 to show that sensor as being dry. If, at any time during the 5 second period, that sensor read "wet", the controller 109 would maintain a "wet" indication.

In some embodiments, controller 109 would not include a delay to indicate changing a reading of a particular sensor from "dry" to "wet" (indicating an increase in liquid level). This asymmetrical operation may be desirable in refill-in-place containers, where it may be advantageous to rapidly indicate increasing liquid levels in order to avoid overfilling the container. Alternatively, a shorter predetermined time delay (for example, 1 second) could be used when changing a reading of a particular sensor from "dry" to "wet". In some embodiments, controller 109 might store previous readings of ultrasonic sensors 156 to employ hysteresis based upon one or more previous readings of the ultrasonic sensors.

Some embodiments of controller 109 might desirably communicate liquid level data to external devices, for example, a central computer located within the manufacturing facility, such that plant operators can monitor liquid levels of multiple containers remotely from a single location. For example, controller 109 might provide a two wire output link for communication to external devices. In such embodiments, controller 109 might provide a "stepped analog output" or quantized output, to communicate the liquid level within the container. For example, a fixed voltage (or current) step might be output corresponding to each ultrasonic sensor 156. For example, if the lowest ultrasonic sensor senses liquid (e.g., ultrasonic sensor 156l), corresponding to the lowest liquid level within the container a first voltage (or current) might be output by controller 109. This voltage (or current) might be increased by a fixed step for each sensor above ultrasonic sensor 156l that senses liquid. In one exemplary embodiment, the stepped analog output is 4-20 mA across the 12 ultrasonic sensors 156. In another exemplary embodiment, the stepped analog output is 0-10V across the 12 ultrasonic sensors 156, although other voltage or current ranges are possible (e.g., 0-5 volts, etc.). In some embodiments, the type of the stepped analog output (e.g., voltage or current) might be selectable by a user, for example, based upon a type of equipment to which controller 109 is electrically coupled, or an environment in which controller 109 is operating. For example, in practice, a stepped analog current output might be less susceptible to noise that a stepped analog voltage output in some operating environments.

Providing an output and configuring the controller 109 to generate a stepped analog output or digital output enables other components in the system in which the container 159 is used to receive information concerning fluid level in the container 159 with only a two-wire interface. This is an improvement over sensor probe systems of the prior art, in which it was common for the output to consist of at least one output signal wire for each of the ultrasonic sensors 156.

Figure 4:
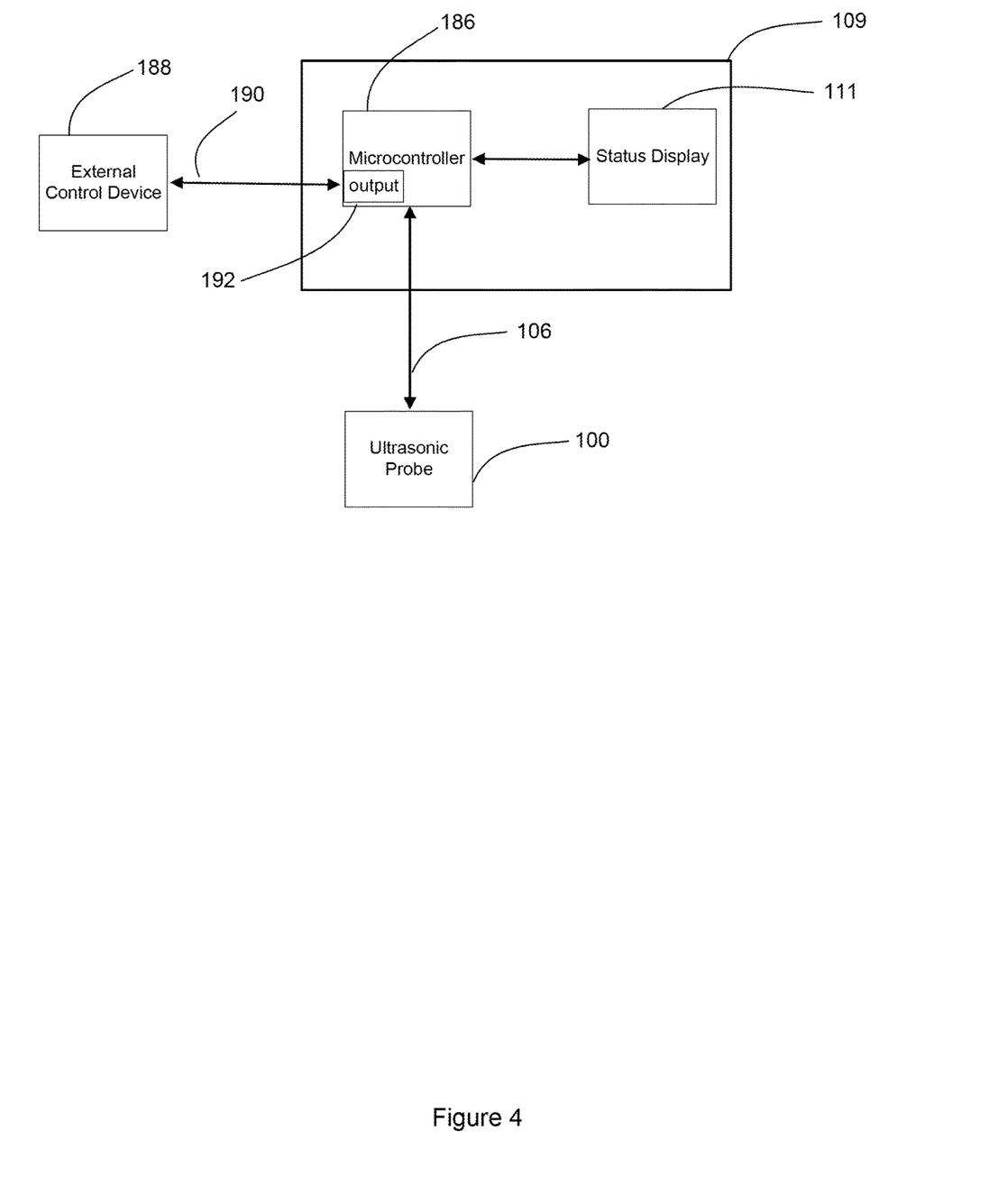
FIG. 4 is a block diagram of a controller circuit coupled to the ultrasonic probe in accordance with exemplary embodiments.

FIG. 4 shows a block diagram of circuitry of controller 109. As shown in FIG. 4, controller 109 includes microcontroller 186 and status display 111. As described, status display 111 might be implemented as one or more LEDs, an LCD screen, or other display types suitable to display the liquid level within container 159. Ultrasonic probe 100 is in electrical communication with microcontroller 186, for example, by cable 106 and wiring 158, to communicate electronic signals between ultrasonic sensors 156 and microcontroller 186. Microcontroller 186 processes signals received from ultrasonic probe to determine a liquid level of container 159. Microcontroller 186 then controls status display 111 to display an indication based on the determined liquid level. In some embodiments, microcontroller 186 is electrically coupled, for example via signal output 192 and cable 190, to one or more external control devices 188. External control devices 188 might be a database or monitoring application on a computer or server of the manufacturing facility or might be a control unit of specific manufacturing equipment. As described, in some embodiments cable 190 might be a two-conductor cable, and microcontroller 186 might communicate over the two-conductor cable via a "stepped analog output" or quantized output corresponding to the determined level of liquid in container 159 via ultrasonic probe 100. In embodiments employing 12 ultrasonic sensors 156 and a stepped analog output, such as a stepped analog output current, the stepped analog output current might be as shown in Table 1 below:

TABLE 1

| Highest "Wet" Sensor | Stepped Analog Output Current (mA) |
|---|---|
| none | 4.0 |
| 156l | 5.3 |
| 156k | 6.7 |
| 156j | 8.0 |
| 156i | 9.3 |
| 156h | 10.7 |
| 156g | 12.0 |
| 156f | 13.3 |
| 156e | 14.7 |
| 156d | 16.0 |
| 156c | 17.3 |
| 156b | 18.7 |
| 156a | 20.0 |

In alternative embodiments, controller 109 might provide a standardized communication link (such as Ethernet) to link controller 109 to other computers, servers or controllers within the manufacturing facility to enable remote monitoring of liquid levels in one or more containers. In such embodiments, controller 109 might simply communicate an estimated liquid level within the container, might report which ones of ultrasonic sensors 156 are sensing liquid, might report the status of each of ultrasonic sensors 156, or some combination thereof. In such embodiments, microcontroller 186 might be in communication with a communication module to provide data in the format of the standardized communications link (e.g., an Ethernet communications module to format data from microcontroller 186 into Ethernet data packets).

While the principles of the claimed invention have been described above in connection with preferred embodiments, it is to be clearly understood that this description is made only by way of example and not as a limitation of the scope of the claimed invention. * * *

What is claimed is:

1. A method of determining and displaying a fluid level of a fluid in a container using a probe positioned within the container, the probe having a plurality of ultrasonic sensors located within a barrel, each of the plurality of sensors being located at a different fluid level in the container, the method comprising:
    (a) sending an electrical pulse to a first sensor of the plurality of ultrasonic sensors; wherein the first sensor then emits sound waves, detects echoed back sound waves, converts the echoed sound waves into an electrical signal to send out;
    (b) receiving the electrical signal from the first sensor in response to the electrical pulse sent in step (a);
    (c) performing step (a) on each of the plurality of ultrasonic sensors in a first sequence;
    (d) repeating step (a) at a first frequency;
    (e) determining a status of the first sensor based on at least one electrical signal from the first sensor received in step (b), the status being selected from the group of: dry status, wet status and, error status, the wet status indicating a presence of the fluid at the fluid level at which the first sensor is located, the dry status indicating an absence of the fluid at the fluid level at which the first sensor is located;
    (f) changing the status of the first sensor as determined in step (e) to a different status than was determined in an immediately preceding performance of step (e) only if at least one predetermined condition is met;
    (g) performing steps (e) and (f) on each of the plurality of ultrasonic sensors;
    (h) repeating step (g); and
    (i) displaying a visual indication of the status of each of the plurality of ultrasonic sensors as determined in steps (e) through (g).

2. The method of claim 1, wherein the at least one predetermined condition comprises receiving a plurality of electrical signals from the first sensor during sequential performances of step (b) on the first sensor that all indicate the same status.

3. The method of claim 1, wherein the at least one predetermined condition comprises receiving a plurality of electrical signals from the first sensor during sequential performances of step (b) on the first sensor over a predetermined period of time that all indicate the same status.

4. The method of claim 3, wherein the predetermined period of time is a first predetermined period of time if the status of the first sensor is changing from wet status to dry status and a second predetermined period of time if the status of the first sensor is changing from dry status to wet status, the first predetermined period of time being greater than the second predetermined period of time.

5. The method of claim 3, wherein the predetermined period of time is at least five seconds.

6. The method of claim 1, further comprising repeating step (f) if the change in status of the first sensor is from wet status to dry status.

7. The method of claim 1, wherein step (f) comprises determining the status of the first sensor to be error status if the electrical signal from the first sensor received in step (b) indicates a dry status and any of the plurality of sensors located at a fluid level above the first sensor is currently determined to be wet status.

8. A system comprising for determining the level of a fluid in a container, the system comprising:
a controller;
an ultrasonic probe comprising a fitting assembly adapted to be attached to the container, a barrel extending downwardly from the fitting assembly, and a plurality of ultrasonic sensors located within the barrel, each of the plurality of ultrasonic sensors being electrically linked to the controller and adapted to receive electronic signals sent from the controller, emit sound waves in response to the electronic signals sent from the controller, detect echoed back sound waves, and transmit electronic signals to the controller indicative of the detected sound waves, the ultrasonic probe being shaped and configured to be inserted into the container; and
a display that is electrically linked to the controller;
wherein the controller is operationally configured to send electrical pulses at a first frequency and to direct the electrical pulses to each of the plurality of ultrasonic sensors in a first sequence;
wherein the controller is operationally configured to determine a status of each of the plurality of ultrasonic sensors based on the transmitted electronic signals from each of the plurality of ultrasonic sensors, the status including a dry status and a wet status, the wet status meaning that the transmitted electronic signal received from a sensor of the plurality of ultrasonic sensors indicates that a fluid level in the container is at or above the position of that sensor, the dry status meaning that the transmitted electronic signal received from a sensor of the plurality of ultrasonic sensors indicates that a fluid level in the container is below the position of that sensor;
wherein the controller is operationally configured to cause the display to provide a visual indication of dry status or wet status for each of the plurality of ultrasonic sensors;
wherein the controller is operationally configured to change the visual indication for any one of the plurality of ultrasonic sensors from wet status to dry status only if at least one predetermined criteria is met.

9. The system of claim 8, wherein the at least one predetermined criteria comprises that all transmissions of electronic signals from the one of the plurality of ultrasonic sensors during a predetermined period of time indicate dry status for that one of the plurality of ultrasonic sensors, the predetermined period of time being sufficiently long to allow a plurality of electrical pulses to be sent from the controller to the one of the plurality of ultrasonic sensors during the predetermined time period.

10. The system of claim 8, wherein the status further includes an error status and wherein the controller is operationally configured to change the visual indication for any one of the plurality of ultrasonic sensors from dry status to error status if the status of any of the plurality of ultrasonic sensors located above the one of the plurality of ultrasonic sensors is wet status.

11. The system of claim 8, wherein the barrel comprises:
an outer tube having an upper opening, a lower opening, a sidewall, and a side opening disposed in the sidewall; and
an inner tube coupled to the outer tube, the inner tube comprising an upper opening, a lower opening, and a sidewall, the upper opening of the inner tube being aligned with the side opening of the outer tube, the lower opening of the inner tube being aligned with the lower opening of the outer tube, wherein the inner tube defines the conduit, wherein the internal volume is located between the sidewall of the inner tube and the sidewall of the outer tube and at least a portion of the plurality of ultrasonic sensors are located within the internal volume.

12. The system of claim 8, wherein further comprising a multi conductor shielded cable comprising a first shield, a second shield, and a plurality of conductors, the first shield comprising an outer shield, each of the plurality of conductor being individually insulated but not individually shielded.

* * * * *